United States Patent
Hohensee et al.

(10) Patent No.: US 7,268,905 B2
(45) Date of Patent: Sep. 11, 2007

(54) BIDIRECTIONAL PRE- AND POST- PROCESSOR CONDUIT THROUGH A BIDIRECTIONAL PRINTING DATA STREAM

(75) Inventors: Reinhard H. Hohensee, Boulder, CO (US); Robert F. Jessen, Berthoud, CO (US); David E Stone, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 10/175,114

(22) Filed: Jun. 19, 2002

(65) Prior Publication Data

US 2003/0234954 A1 Dec. 25, 2003

(51) Int. Cl.
G06F 3/12 (2006.01)
G06F 15/00 (2006.01)
G06F 13/00 (2006.01)

(52) U.S. Cl. .............. 358/1.15; 358/1.6; 358/1.13; 370/320; 370/466; 370/469; 710/11; 710/105; 710/315; 709/230; 709/236

(58) Field of Classification Search ............ 395/114, 395/774, 744; 358/1.6, 1.13, 1.15; 399/384; 710/11, 105, 315; 370/320, 466–469, 329, 370/312; 709/230, 236, 237, 238, 239
See application file for complete search history.

(56) References Cited

U.S. PATENT DOCUMENTS

| 4,651,278 A | 3/1987 | Herzog et al. |
| 5,559,933 A | 9/1996 | Boswell |
| 5,592,683 A | 1/1997 | Chen et al. |
| 5,727,220 A * | 3/1998 | Hohensee et al. .......... 715/513 |
| 5,822,506 A * | 10/1998 | Chen et al. ................ 358/1.15 |
| 5,825,769 A | 10/1998 | O'Reilly et al. |
| 5,946,460 A | 8/1999 | Hohensee et al. |

(Continued)

FOREIGN PATENT DOCUMENTS

EP 0837401 A2 4/1998

OTHER PUBLICATIONS

Website reference: http://www.up3i.com/ , "About" page.*

(Continued)

Primary Examiner—Aung S. Moe
Assistant Examiner—Scott Schlack
(74) Attorney, Agent, or Firm—Duft, Bornsen & Fishman, LLP

(57) ABSTRACT

A system and method for communicating commands and data to a printer and pre- and post-processors through a link using different protocols. In the exemplary embodiment, $UP^3I$ finishing instructions for a print file are specified in a MO:DCA Form Definition and processed by a print server on a host computer. Print commands are generated by the host computer and transmitted to a printer using the Intelligent Printer Data Stream (IPDS) Architecture. The processor within the printer receives and processes the $UP^3I$ pre- and post-processor commands received via the IPDS communications link and generates commands on a separate communications channel according to the Universal Printer Pre- and Post-Processing Interface ($UP^3I$) for transmission to the pre- and post-processors. Status reported by the pre- and post-processors according to the $UP^3I$™ specification are received by the printer and transmitted to the host computer.

22 Claims, 4 Drawing Sheets

U.S. PATENT DOCUMENTS

| | | | |
|---|---|---|---|
| 5,982,997 | A | 11/1999 | Stone et al. |
| 6,020,970 | A | 2/2000 | Erickson et al. |
| 6,067,554 | A | 5/2000 | Hohensee et al. |
| 6,097,498 | A | 8/2000 | Debry et al. |
| 6,381,440 | B1* | 4/2002 | Bock et al. .............. 399/384 |
| 6,924,906 | B1* | 8/2005 | Schwier et al. ............ 358/1.6 |
| 7,072,056 | B1* | 7/2006 | Greaves et al. ........... 358/1.15 |

OTHER PUBLICATIONS

J.F. DiMarzio, Network Architecture and Design: A Field Guide for IT Consultants, May 11, 2001, Sams, Chapter 6: Choosing a Protocol.*

Farinacci et al., Network Working Group, CISCO, Generic Routing Encapsulation, Mar. 2000.* http://www.up3i.org/download/index.html, Link: Frequently Asked Questions (PDF, 20 kB), Date: Jul. 19, 2001.* http://www.up3i.org/tech_product_info/faq/content.htm, Link: Frequently Asked Questions (PDF, 124 kB), Date: May 2001.*

Snell, N. "Print (almost) anything anywhere," Datamation, vol. 38, No. 19, pp. 83-84, Sep. 15, 1992, USA.

Wilson, D. "*Intelligent* *Printer* *Data* Stream," Proceedings of the SEAS Anniversary Meeting 1987, pp. 707-717, vol. 2, SHARE Eur. Assoc., Nijmegen, Netherlands 1987.

* cited by examiner

BIDIRECTIONAL PRE- AND POST- PROCESSOR CONDUIT THROUGH A BIDIRECTIONAL PRINTING DATA STREAM

BACKGROUND OF THE INVENTION

1. Field of the Invention

The present invention relates to controlling printing equipment, and more specifically to a system and method for communicating commands to computer control printing and paper handling equipment.

2. Description of Related Art

High volume, high capacity printing systems have been developed that allow a variety of types of processing to be performed to the paper or other media upon which data is printed. An example of such printing system are completely automated systems that produce paper bills to be mailed to customers of utilities or other entities that mail a large number of bills. These high speed printing systems are able to produce from several hundred to over one thousand pages per minute. These printing systems further have pre-processing and post-processing equipment to handle and further prepare the paper or other media that is processed by these printing systems or by successive systems (such as an off-line inserter). Examples of such pre- and post-processing equipment include machines that cut, fold, perforate, staple, edge stitch, post-print, unwind paper, insert sheets from the printer or other paper-supply sources into a stack of printer output and stuff assembled packages of paper into envelopes for mailing.

The pre- and post-processing equipment, which are generically referred to herein as ancillary printing equipment, use a variety of physical and logical connection methods. Each interface between and among this equipment as well as with a printing server is typically designed especially for the devices being connected. This has resulted in the use of a large number of interfaces, both the physical interface as well as the software interface used to command the printing system components, that must be supported by manufacturers. Many of these interfaces are also proprietary to the manufacturer of a particular piece of equipment. This has created difficulty in efficiently integrating or replacing printing system components, especially when mixing components from different manufacturers.

SUMMARY OF THE INVENTION

The complexity of high speed printing systems is increasing as a greater variety of pre- and post-processing equipment is becoming available from an increasing number of sources. In view of these drawbacks, it is an object of the present invention to remove the above-mentioned drawbacks and to facilitate the integration and replacement of printing system components of different models and manufacturers into existing systems by providing an efficient system and method that allows interconnection of high speed printers, pre- and post-processing printing equipment and the printer servers.

One embodiment of the present invention provides a method of communicating processing data to ancillary printing processors. This method establishes a first communications link from a data source to a printer that carries printer control data in a first protocol and also establishes a second communications link from the data source to at least one ancillary printing processor. This second communications link is at least partially made up of the first communications link. Processing data is then communicated between the data source and the at least one ancillary printing processor by a second protocol that contains data that is communicated by the second communications link. The processing data is communicated according to a second protocol that is carried within the first protocol.

Another embodiment of the present invention provides a system for communicating processing data to ancillary printing processors. This system has a first communications link that carries printer control data in a first protocol from a data source to a printer and a second communications link from the data source to at least one ancillary printing processor. At least part of the second communications link is made up of the first communications link and the second communications link carries data that conforms to a second protocol. The system also has a host/server for generating printing and finishing data for transmission over the first communications link and the second communications link.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
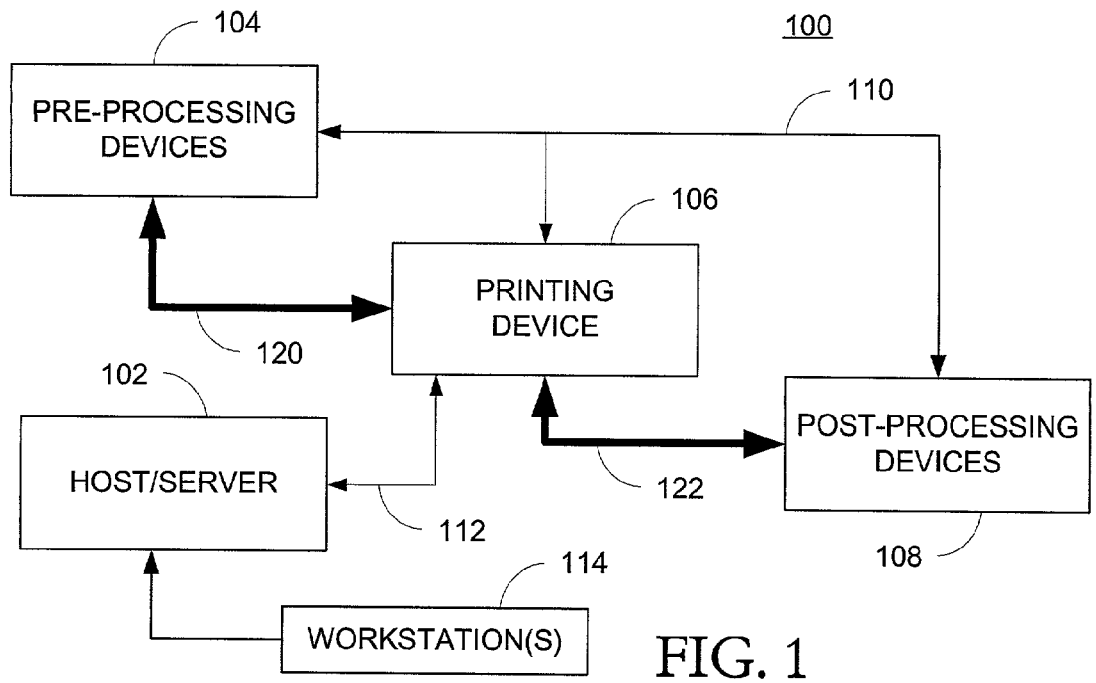
FIG. 1 is a schematic diagram of a printing equipment communications architecture in accordance with an exemplary embodiment of the present invention.

A printing equipment configuration 100 of an exemplary embodiment of the present invention is illustrated in FIG. 1. The printing equipment configuration 100 of the exemplary embodiment has a host/server 102 that generates data files that define documents to print. The exemplary embodiment includes one or more workstations 114 that are used by graphic designers or users with other skills to define part or all of the document to print. Other embodiments utilize other processing architectures to allow the definition of the documents and packages to print. The printing equipment configuration 100 also include high speed, high volume printers that handle and produce several hundred to over one thousand pages per minute. This printing equipment configuration 100 has a printing device 106 that performs the primary printing task of placing the specified image on a page of paper. The printing device 106 of the exemplary embodiment receives data defining the documents to print from the host/server 102. The data generated by the workstation 114 and received by the host/server 102 of the exemplary embodiment conforms to the MO:DCA architecture. The data generated by the host/server 102 and received by the printing device 106 of the exemplary embodiment conforms to the IPDS architecture. The IPDS architecture is defined in the Intelligent Printer Data Stream Reference, IBM Publication #S544-3417-05, Sixth Edition dated March 1996). The MO:DCA architecture is defined in the Mixed Object Document content Architecture Reference, IBM Publication #SC31-6802-05, Sixth Edition, Dated April 2001. The entire contents and teachings of the Intelligent Printer Data Stream Reference and the Mixed Object Document Architecture Reference are hereby incorporated herein by reference.

The printing device 106 (which might contain more than one marking engine) processes paper that is transferred between the printing device 106 and pre-processing devices 104 as well as post-processing devices 108. Paper is transferred into and out of the printing device 106 via the pre-processing device paper path 120 and the post-processing device paper path 122. Embodiments of the present invention are able to operate with one or more pre-processing device within the pre-processing devices 104 and/or one or more post-processing device as part of the post-processing devices 108.

The pre-processing devices 104 and the post-processing devices 108 of the exemplary embodiment accept commands that conform to a protocol that is part of the Universal Printer Pre- and Post-Processing Interface (UP$^3$I). The UP$^3$I is defined in the UP$^3$I™ Specification, produced by the UP Core Group, the entire contents and teachings of which is hereby incorporated herein by reference. The printing device 106, pre-processing devices 104 and post-processing devices 108 of the exemplary embodiment of the present invention are electrically connected via a Universal Printer Pre- and Post-Processing Interface (UP$^3$I) bus 110. The UP$^3$I bus 110 of the exemplary embodiment includes an electrical interface that conforms to the IEEE 1394 standard defined by the Institute of Electrical and Electronics Engineers (IEEE) of Piscataway, N.J. The UP$^3$I bus 110 of the exemplary embodiment conveys commands for pre-processing and post-processing operations that are to be performed by the pre-processing devices 104 and the post-processing devices 108, respectively. The commands communicated via the UP$^3$I bus 110 conform to the UP$^3$I protocol.

A print file containing documents in MO:DCA format is generated on workstation 114 and sent to host/server 102 for printing. The print request is accompanied by a job ticket, such as a MO:DCA Form Definition, that specifies finishing operations to be performed on the print file. In the exemplary embodiment, the finishing operations are specified in a Form Definition using UP$^3$I commands and parameters. The host/server 102 of the exemplary embodiment accepts the print file and job ticket, and derives a composite data stream that consists of an IPDS data stream and an encapsulated UP$^3$I data stream that contains the printing finishing commands for the print file.

The printing device 106 of the exemplary embodiment contains an internal printer controller that receives and processes commands sent by the host/server 102. The internal printer controller of the exemplary embodiment accepts data and commands from the host/server 102 via the IPDS connection 112 and then controls the print engine within the printing device 106 so as to generate the required printed output. The internal controller of the exemplary embodiment further receives the pre-processing and post-processing commands, which are referred to collectively as finishing commands, that are transmitted by the host/server 102 and transmits the associated UP$^3$I commands over the UP$^3$I bus 110 to the pre-processing devices 104 and/or post-processing devices 108. The internal controller of the printing device 106 further monitors the UP$^3$I bus 110 for status information that is generated by devices on the UP$^3$I bus 110, including the pre-processing devices 104 and post-processing devices 108. The status information transmitted by the pre-processing devices 104 and/or the post-processing devices 108 conforms to the UP$^3$I protocol. Upon receipt of status information over the UP$^3$I bus 110, the internal controller of the printing device 106 of the exemplary embodiment generates a corresponding IPDS acknowledgment for transmission over the IPDS bus 112 to the host/server 102. The status information can contain operational characteristics and capabilities as well as error information.

The structures used in the MO:DCA Form Definition to carry finishing commands and parameters conform to the MO:DCA architecture, while the actual finishing commands and parameters conform to the UP$^3$I™ Specification. This allows continued use of software that generates and processes MO:DCA constructs.

The commands issued by the host/server 102 in the exemplary embodiment conform to the IPDS architecture. This allows continued use of software and processing procedures that produce IPDS commands. The IPDS protocol used by the host/server 102 of the exemplary embodiment has been modified to include new IPDS commands that allow communication of UP$^3$I pre-processing and post-processing commands in order to control or monitor the pre-processing devices 104 and/or the post-processing devices 108. The exemplary embodiments of the present invention advantageously allow existing protocols to be generated by the workstation 114 and the host/server 102 although pre-processing devices 104 and post-processing devices 108 require a different protocol. The exemplary embodiments also allow the sharing of device-capabilities description, error recovery, and page tracking information between the UP$^3$I portion of the system and the AFP/IPDS portion of the system. The printing device 106 of the exemplary embodiment interprets these pre-processing and post-processing commands and performs communications via the UP$^3$I bus 110 that corresponds to pre-processing and post-processing commands that are contained within received IPDS commands.

Alternative embodiments of the present invention utilize pre-processing devices 104 and post-processing devices 108 that do not directly accept UP$^3$I commands. These pre- and post-processing devices are either physically incorporated within the same unit as the printing device 106, or they are connected to the printing device 106 via a non-UP$^3$I interface. The internal printer controller in these embodiments processes the UP$^3$I data that is communicated via the IPDS bus 112 and communicates the correct commands to these other pre- and post-processing devices. It is within the spirit and scope of this invention to support a variety of interconnections between the printing device 106 and the pre-processing devices 104 and post processing devices 108. Embodiments of the present invention further use other protocols, aside from the IPDS and UP$^3$I protocols, to control all or some of the pre-processing devices 104, post processing devices 108 and the printing device 106.

Figure 2:
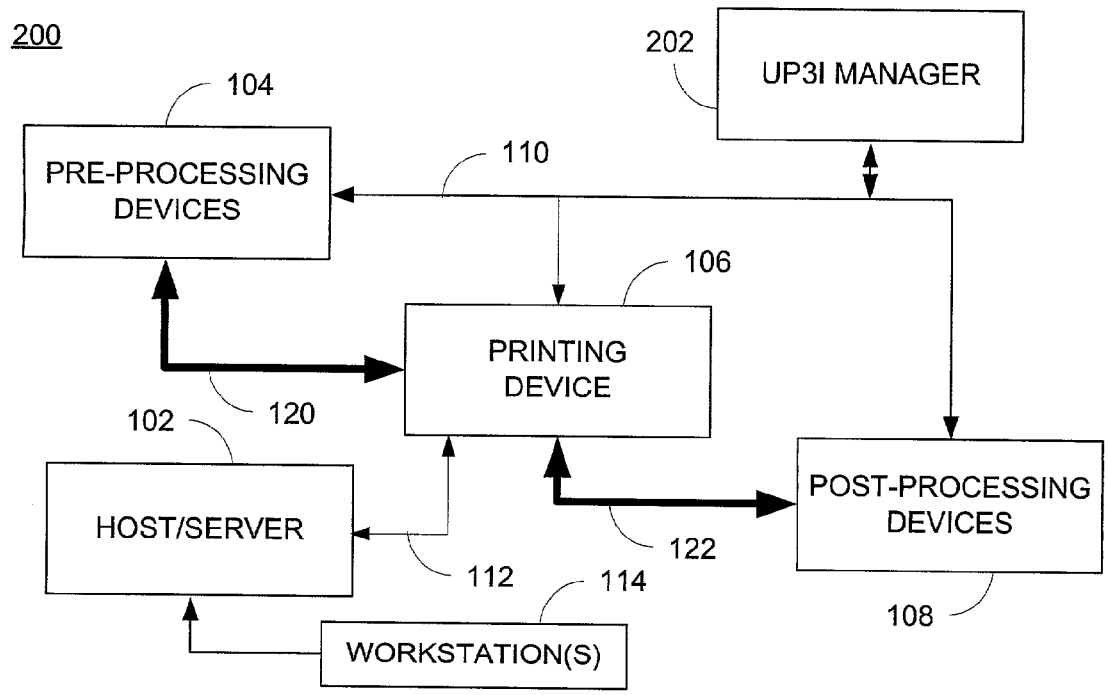
FIG. 2 is a schematic diagram of an alternative printing equipment communications architecture in accordance with a preferred embodiment of the present invention.

An exemplary expanded printing equipment configuration 200 is illustrated in FIG. 2. This expanded printing equipment configuration 200 includes the same components of the previous exemplary printing equipment configuration 100 with the addition of a UP³I manager 202. The UP³I manager 202 is connected to the UP³I bus 110 to monitor data transmitted by those devices onto the UP³I bus 110. This allows direct monitoring of the UP³I data generated by the devices.

Figure 3:
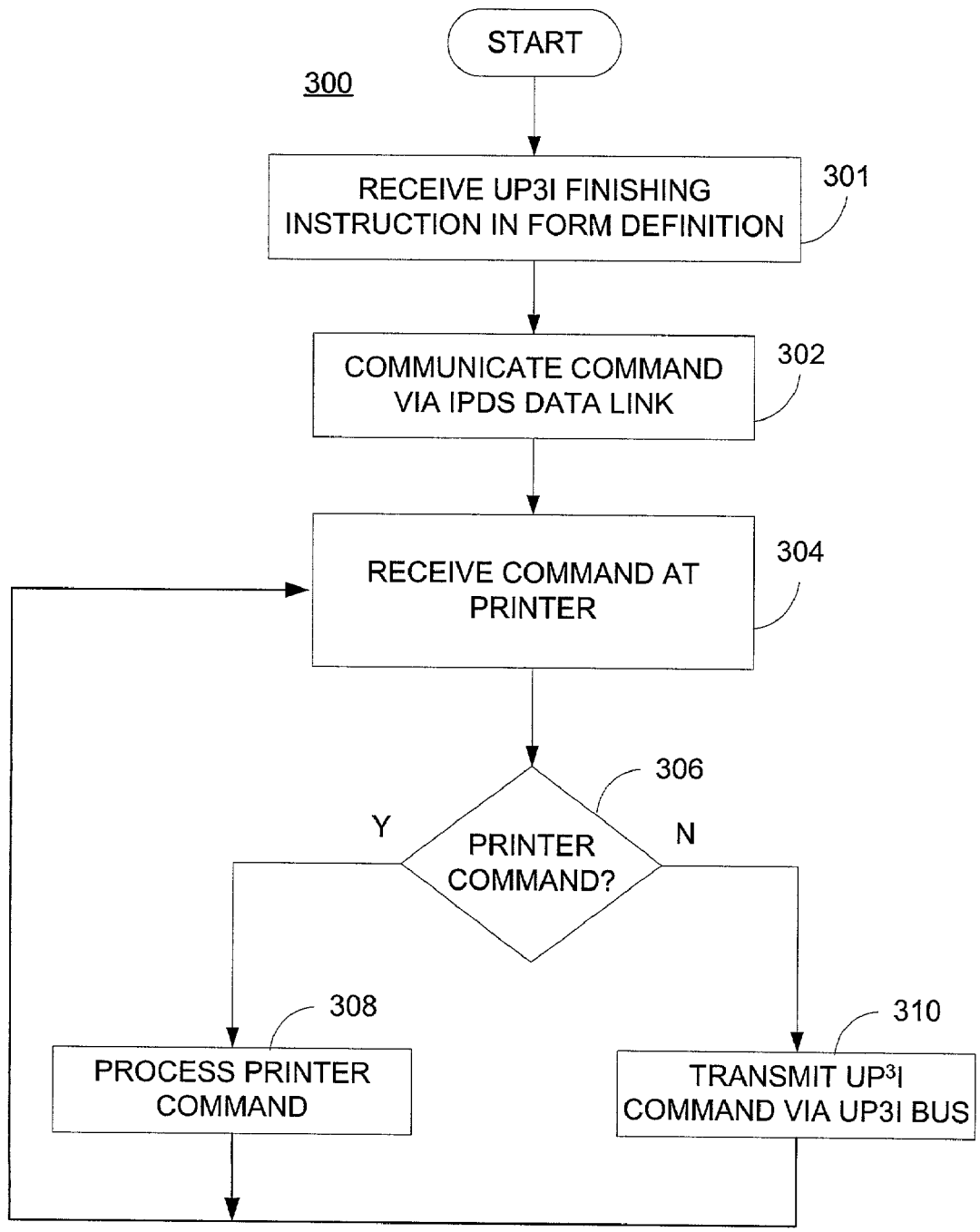
FIG. 3 is a process flow diagram for communicating a pre-processing or post-processing equipment command in accordance with an exemplary embodiment of the present invention.

An exemplary command communications processing flow 300 is illustrated in FIG. 3. The processing begins, at step 301, where the host/server receives a print file along with a Form Definition that specifies UP³I finishing operations for the print file. Processing continues, at step 302, by communicating a command via the IPDS data link from the host/server 102 to the printing device 106. The printing device 106 of the exemplary embodiment receives, at step 304, the command. The processor within the printing device 106 examines the received command and determines, at step 306, whether the received command is a printer command or a pre-processor or post-processor command. If the command is a printer command, the command is processed, at step 308. An example of a printer command is a command that requires configuration of the print engine within the printing device 106. If the command is not a printer command, the processor within the printing device 106 of the exemplary embodiment generates, the associated UP³I command and transmits, at step 310, that command. In the normal course of printer operations or in response to specific IPDS commands, UP³I commands might also be generated by printing device 106.

Figure 4:
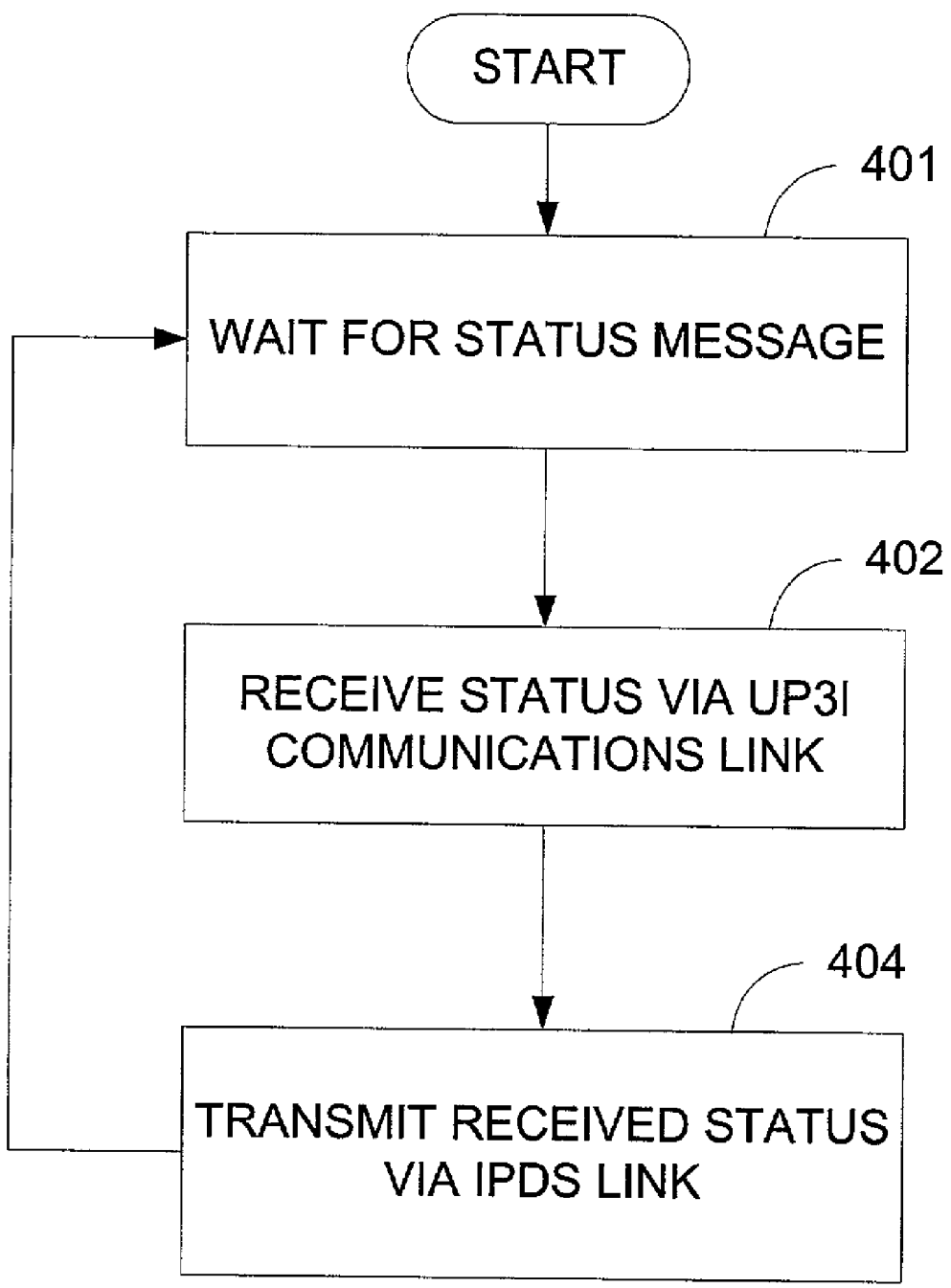
FIG. 4 is a processing flow diagram for communicating a pre-processing or post-processing equipment status message in accordance with an exemplary embodiment of the present invention.

An exemplary status communications processing flow 400 is illustrated in FIG. 4. This status communications processing flow begins by waiting, at step 401, for a status message to be communicated via the UP³I bus 110. The processing then receives, at step 402, the status message at the printing device 106. The processor within the status printing device 106 generates the associated IPDS message and transmits, at step 404, that message to the host/server 102. The processing then continues by waiting, at step 401, for a further status message to be communicated via the UP³I bus 110.

Protocol Extensions to Carry UP³I Protocol Data

An exemplary embodiments of the example of the present invention operate by introducing new commands to the IPDS protocol as well as the MO:DCA architecture. These protocols define rules for command triplets and self defining fields (SDFs). The Tupels discussed below are defined by the UP³I specification to be ordered chains of paper sequence IDs. The IPDS specification defines the commands discussed below that begin with the letters XOH and XOA.

The added command data, which include new commands and added values to existing commands, are defined below:

Extensions for the MO:DCA Medium Finishing Control (MFC) Structured Field

The MFC structured field is specified in a Form Definition to specify finishing operations that are to be applied to the print file. Such operations are currently specified in a Finishing Operation (X'85') triplet. The MFC structured field is being extended to allow UP³I finishing operations to be specified for the print file. This is done by allowing a new triplet to be used on the MFC—the UP³I Finishing Operation (X'8E') triplet, which contains the UP³I Form Finishing Operating (X'03') triplet that is defined by the UP³I™ Specification.

Extensions for the IPDS Sense-Type-and-Model Command

UP³I Property Pair for IPDS Sense Type and Model (STM)

Data Value returned within IPDS STM reply: X'F101'

Meaning of Data Value: A printer returning this data value within an STM reply processes UP³I finishing extensions to the IPDS interface. An existing UP³I interface is reported with this data value.

A printer that reports this data value via the IPDS interface supports the UP³I related IPDS commands, including:

XOH-OPC UP³I Tupel SDF with the UP³I Finishing Device Entry

XOH-OPC UP³I Paper Input Media SDF

UP³I Finishing Operation Triplet in the XOH-DGB and the AFO commands

XOA Discard Unstacked Pages

UP³I Exceptions including Sense Format 8 and Set Recovery.

Note: Indicating UP³I support does not necessarily mean that a UP³I device is available in the print system. This is indicated in an IPDS Obtain Printer Characteristics (OPC) reply.

Data Value returned within IPDS STM reply: X'80F5'

Meaning of Data Value: XOA-Discard Unstacked Pages command is supported.

A printer that reports this property pair supports the XOA-Discard Unstacked Pages command.

Extensions for the XOH-OPC IPDS Command

The UP³I Tupel Self Defining Field (SDF)

This SDF reports the physical order and properties of the UP³I devices connected to the print system.

Data Field Definitions of the UP³I Tupel SDF:

Bytes 0-1 of the UP³I Tupel SDF contain the SDF length field. These two bytes form a data value of type unsigned binary and is valid with a value greater or equal to 9. This length value includes the SDF length field itself.

Bytes 2-3 contain the hexadecimal value 0019, which is the UP³I Tupel SDF ID value.

Bytes 4-5 contain the UP³I Tupel ID and are able to have a value of hexadecimal 0001 through FFFF. A value of 0000 is reserved.

The remaining bytes contain finishing device information with one or more UP³I finishing device entries.

One UP³I tupel SDF reports the UP³I devices that define one tupel. There are as many UP³I tupel SDFs in an OPC as there are tupels in an UP³I processing line. The paper flow within one tupel is described by the paper Sequence IDs, the devices are ordered ascending. The paper moves from the device with the lowest paper sequence ID to the device with the next higher one.

UP³I Finishing Device Entry

The UP³I finishing device entries are the data that are contained within the last field of the above SDF. Each of these entries has the following format:

Data Definition of the UP³I Finishing Device Entry:

Byte 0 of this entry is the entry length field that contains the length (i.e., number of bytes) of this entry, including this field. This field is able to contain a value between hexadecimal 03 and FF.

Byte 1 of this entry contains the UP³I finishing device entry ID, which is a value of 01.

Byte 2 contains the paper sequence ID of the finishing device associated with this entry. This byte is able to contain any value between 0 and hexadecimal FF.

The remaining bytes of this entry contain one or more UP³I SDF triplets related to device with the paper sequence ID above.

One UP³I finishing device entry reports the characteristics of one UP³I device. Several UP³I SDF triplets may be included in one UP³I Tupel SDF. All these entries describe one UP³I device.

The following UP³I Self Defining Field (SDF) Triplets, which are described in the UP³I™ Specification, are supported by the UP³I Finishing device entry:

UP³I Version Triplet
Device Type Triplet
Self Defining Field Triplet
Paper Input Format Triplet
Paper Output Format Triplet
UP³I Product ID Triplet UP³I Paper Input Media SDF This SDF reports the media attributes of all media that exist in the UP³I line.

Description of the UP³I Paper Input Media SDF

Bytes 0 through 1 of this SDF are of type unsigned binary and contain the Length field. This field is able to contain a value between hexadecimal 0005 and FFFF. This field contains the length of this SDF, including this field itself.

Bytes 2 through 3 contain the UP³I Paper Input Media SDF ID field. This field contains the hexadecimal value 001A, which indicates the UP³I Paper Input Media SDF ID.

Byte 4 contains the Media Source ID field. This field is able to contain hexadecimal values between 00 and FF. This field contains the Media Source ID as defined in OPC Printable Area SDF communicated under the IPDS protocol.

The remaining bytes contain the UP³I Paper Input Media Triplet with its Sub Triplets, as defined in the UP³I specification; extra bytes beyond the UP³I-defined bytes are ignored.

The relation between the Printable-Area SDF and this UP³I Media Attribute SDF is based upon:

Media Source ID (Byte 4) of the Printable-Area SDF and by the

Input Media ID (Byte 3) of the UP³I Paper Input Media Triplet. For every media that is available in the UP³I line there may exist a Paper Input Media Triplet with its Sub Triplets.

The UP³I paper input media triplet and its sub triplets are described in the UP³I™ specification.

The UP³I paper input media triplet is optional in the UP³I specification; when the length of this SDF is only five bytes, there is no data available. The Paper Input Media Triplet supports the following sub triplets:

Paper Input Media Name Sub Triplet
Paper Input Media Coating Sub Triplet
Paper Input Media Brightness Sub Triplet
Paper Input Media Color Sub Triplet
Paper Input Media Imagable Side Sub Triplet
Paper Input Media Color Name Sub Triplet
Paper Input Media Set Count Sub Triplet
Paper Input Media Opacity Sub Triplet
Paper Input Media Pre Printed Sub Triplet
Paper Input Media Recycled Sub Triplet
Paper Input Media Roll Diameter Sub Triplet
Paper Input Media Thickness Sub Triplet
Paper Input Media User Media Type Sub Triplet
Paper Input Media Weight Sub Triplet Note: The Media Source ID allows the host program to associate the Media Attributes contained in the UP³I Input Media Triplet with the Media Sources (Input Bins) specified in the OPC-Printable Area-SDF.

The direction of the width and length parameters in the paper input media triplet refer (different than it is in IPDS) to the paper movement direction.

The units for distance parameters used in the UP³I specification are different from those in the IPDS specification. UP³I uses milli-points, one milli-point is $\frac{1}{72000}$ inch.

However, these values are not relevant for the host software, because they are also defined in the OPC-Printable Area-SDF (i.e. Length/Width of Media Presentation space, Offset/Extend of Printable Area, some Media characteristics). The host program uses the OPC-Printable Area-SDF to control its presentation process. The IPDS controller together with the UP³I Manager guarantee that the information contained in both SDFs is consistent.

Extensions for XOH-DGB and AFO (Apply Finishing Operation)

The IPDS format has its own finishing operating triplet (X'85'), but the newly added UP³I form finishing operating triplet, which is carried by the Medium Finishing Control (MFC) structured field in the MO:DCA Form Definition, allows UP³I command data to be transmitted via the IPDS data bus 112 so that the printing device 106 is able to transmit the corresponding UP³I command via the UP³I bus 110.

UP³I Finishing Operation Triplet

Description of the UP³I Finishing Operation Triplet Data Fields

Byte 0 of this triplet is an unsigned binary data element containing the Length field. This byte is able to have a value between hexadecimal 05 and FE. This byte contains the length of this triplet, including this field itself.

Byte 1 contains the Triplet ID field. This byte contains the hexadecimal value 8E, which identifies the UP³I Finishing Operation triplet.

Bytes 2 and 3 are reserved.

The remaining bytes contain data representing the UP³I Form Finishing Operation Triplet as defined in the UP³I™ specification; this field contains bytes 4 through the end of the UP³I Form Finishing Operation triplet; extra bytes beyond the UP³I-defined bytes are ignored.

A restriction of the exemplary embodiment of the present invention is that the finishing operation types "Paper Input/Page interpose" are rejected in the IPDS triplet with hexadecimal ID value 8E. The existing IPDS interpose functionality is used instead.

This triplet can be carried on the IPDS Define Group Boundary (DGB) command that starts a group and is valid for all sheets in the group.

This triplet can also be carried on an Apply Finishing Operations (AFO) command for a single sheet operation.

XOA Discard Unstacked Pages

The XOA Discard Unstacked Pages (DUP) command deletes all buffered data from the printer storage, discards all printed but unstacked pages, and returns the printer to home state.

Definition of the XOA Discard Unstacked Pages Data Fields

Bytes 0 through 1 of this data element contain the Order code field. This field has the hexadecimal value of F500, which indicates the Discard Unstacked Pages (DUP) order code.

UP$^3$I-Specific Exception IDs Added to IPDS

The printing device 106 of the exemplary embodiment monitors the status of devices connected to the UP$^3$I bus 110. Status data is reported back to the host/server via the exception handling defined by the IPDS protocol but with exception IDs that have been added to the IPDS specification to reflect UP$^3$I equipment status. Further Information concerning IPDS exception handling is provided in the IPDS specification. The added exception IDs for UP$^3$I status data are defined below.

Exception: Intervention Required

Exception ID Hexadecimal Value: X'407E . . . 00'
Indicates: Intervention required on a UP$^3$I-controlled device
Action Code: X'08', X'0A', X'1A', or X'22'
Explanation: A pre-processing or post-processing device attached to the printer has reported an intervention required condition. The specific error is identified in the sense bytes 8-9. This exception ID uses sense-byte format 8.
Alternate Exception Action: None
Page Continuation Action: None Exception: Specification Check Exception ID Hexadecimal Value: X'027E . . . 00'
Indicates: Invalid or unsupported parameter specification for a UP$^3$I-controlled device Action Code: X'01', X'06', or X'09'
Explanation: A specification error was detected for a UP$^3$I pre-processing or post-processing device. The specific error is identified in the sense bytes 8-9.
The UP$^3$I Finishing Operation (X'8E) triplet is used to specify finishing operations for UP$^3$I pre-processing or post-processing devices attached to the printer. This exception ID uses sense-byte format 8.
Alternate Exception Action: None
Page Continuation Action: None Exception: Conditions Requiring Host Notification Exception ID Hexadecimal Value: X'0109 . . . 00'
Indicates: Supported finishing operations changed.
Note: Use existing NACK Exception ID Hexadecimal Value: X'017E . . . 00'
Indicates: Condition requiring host notification on a UP$^3$I-controlled device
Action Code: X'09', X'1A', or X'1D'
Explanation: A pre-processing or post-processing device attached to the printer has reported a condition requiring host notification. The specific error is identified in the sense bytes 8-9. This exception ID uses sense-byte format 8.
Alternate Exception Action: None
Page Continuation Action: None Exception: Equipment Check with Intervention Required Exception ID Value: X'507E . . . 00'
Indicates: Intervention required because of an equipment check on a UP$^3$I-controlled device
Action Code: X'08', X'09', X'16', or X'22'
Explanation: A pre-processing or post-processing device attached to the printer has reported an equipment check error that is also an intervention required condition. The specific error is identified in the sense bytes 8-9. This exception ID uses sense-byte format 8.
Alternate Exception Action: None
Page Continuation Action: None Exception: Equipment Check Exception ID Value: X'107E . . . 00'
Indicates: Equipment check on a UP$^3$I-controlled device.
Action Code: X'09', X'22' or X'23'
Explanation: A pre-processing or post-processing device attached to the printer has reported an equipment check error that can not be corrected by an operator. The specific error is identified in the sense bytes 8-9. This exception ID uses sense-byte format 8.
Alternate Exception Action: None
Page Continuation Action: None Definition of Sense Byte Format 8

Sense Byte Format 8 is used by some of the above exceptions. Bytes 8-18 of the format are defined by UP$^3$I, all other bytes are part of IPDS exception reporting.

Bytes 0 and 1 of this format contain the Exception Class & Exception ID, which are bytes 1 and 2 of the 3-byte Error Code.

Byte 2 of this format contains the Action Code field, which also may indicate that some counter adjustments are required. The counter values (RPC, CPC, JPC, OPC, SPC) represent IPDS-defined tracking points in the logical paper path and are described in the IPDS Specification. The meanings associated with the different hexadecimal values of this byte are defined as:
    Value=01: Data stream exception.
    Counter Adjustments: Normal IPDS handling
    Value=06: Function no longer achievable
    Counter Adjustments: No change
    Value=08: Physical media jam
    Counter Adjustments: RPC<-JPC
      CPC<-JPC
      OPC<-JPC
      JPC no change
      SPC<-JPC
    Value=09: Data related print exceptions
    Value=16: Hardware Related Print Exception Value=1A: Re-drive buffered pages
Value=1D: Printer characteristics changed
Value=23: Temporary HW exception
Counter Adjustments for 09, 16, 1A, 1D, and 23:
  RPC<-CPC
  CPC no change
  OPC no change
  JPC no change
  SPC no change
Value=0A: Pre/Post processor exception
Counter Adjustments: RPC<-JPC
Counter Adjustments: CPC<-JPC
Counter Adjustments: OPC<-JPC
Counter Adjustments: JPC no change
Counter Adjustments: SPC<-no change
Value=22: Printer inoperative. Counter Adjustments defined by the printer.

Byte 3 of this format indicates Printer Dynamic Conditions.

Byte 4 contains hexadecimal value DE, and indicates a device error.

Byte 5 contains the value 08 which is the Format Identifier. This is the UP$^3$I-specific sense data format.

Bytes 6 and 7 contain the value of the IPDS command ID for which the error is being reported.

Bytes 8 and 9 contain a UP$^3$I specific error code. This error code is device specific as is defined by the UP$^3$I™ specification Byte 10 contains the Paper Sequence ID of the Pre/Post processing device which caused the exception.

Bytes 11 and 12 are set to zero and are reserved (for set error recovery).

Bytes 13 and 14 are set to zero and are reserved (for set error recovery).

Bytes 15 through 16 contain the ID of the active UP$^3$I tupel.

Bytes 17 and 18 are set to 0000 and are reserved.

Byte 19 is set to 00 and is Byte 3 of the 3-byte error code.

Bytes 20 through 23 contain the Page Identifier.

IPDS Data Stream with UP$^3$I Triplets

Figure 5:
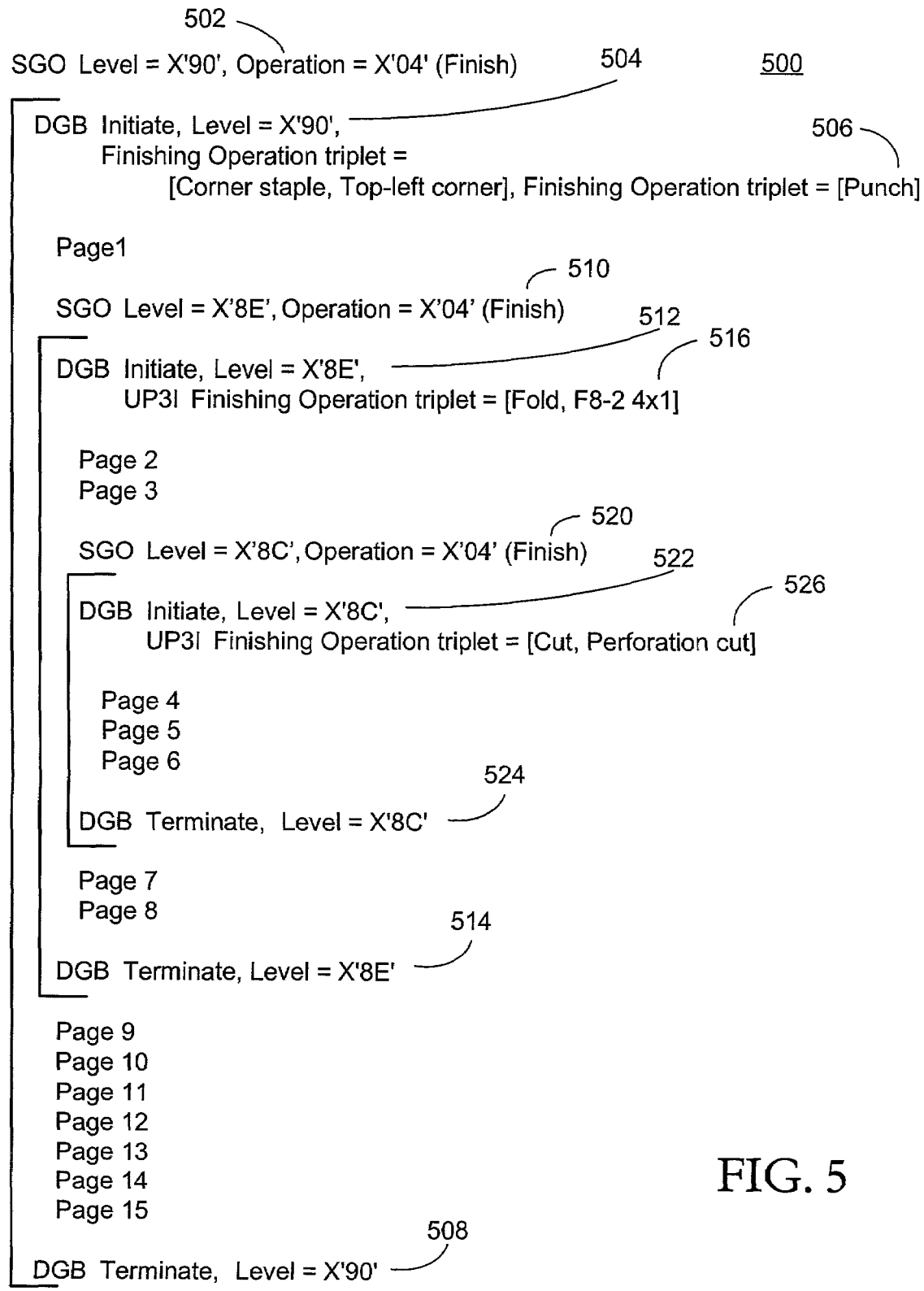
FIG. 5 is an example showing several finishing operations in the context of an IPDS data stream.

An exemplary IPDS data stream that includes UP$^3$I Triplets is illustrated in FIG. 5. X'8E' triplets are initially specified on the Medium Finishing Control (MFC) structured field in the MO:DCA Form Definition at print-job submission. The exemplary IPDS command flow 500 describes a complete print package has three nesting levels or sub-portions defined by the IPDS commands XOH DGB and XOH SGO (Specify Group Operation), which are shown as "DGB" and "SGO" commands in the exemplary IPDS command flow 500. In the exemplary embodiment, each time a new nesting level is defined, an XOH SGO command is specified.

The first package sub-portion is initiated by the first XOH SGO command 502 that defines the level as X'90' and the operation to be X'04', "finishing operations." The first package sub-portion is defined by a first DGB command 504 and is terminated by a first DGB Terminate command 508, both for level X'90' as defined by the first SGO command 502. The first package sub-portion includes the entire print package, which are pages one through fifteen, in this example. The first DBG command 504 includes a first finishing operation command 506 that specifies two finishing operation triplets—a first specifying "Corner staple, Top-left corner" and another specifying "Punch." These finishing operations will be applied to all of the pages within the first package sub-portion. The finishing operation triplets used in the first DGB command 504 causes the first package sub-portion, which is the entire document in this example, to be punched and stapled at the top left corner.

The second package sub-portion is initiated by the second SGO command 510 that defines the level as X'8E' and the operation to be X'04', "finishing operations." The second package sub-portion is defined by the second DGB command 512 and is terminated by the second DGB terminate command 514, both for level X'8E' as defined by the second SGO command 510. The second package sub-portion in this example includes only part of the print package, i.e., page 2 through page 8. The second DGB command 512 includes a second finishing operation command 516 that contains one finishing operation triplet specifying "Fold, F8-2 4×1." The finishing operation triplet within the second finishing operation command 516 of this example causes the pages within the second package sub-portion to be folded using a z-fold.

The third package sub-portion is initiated by a third SGO command 520 that defines the level as X'8C' and the operation to be X'04', "finishing operations." The third package sub-portion is defined by a third DGB command 522 and is terminated by a third DGB terminate command 524, both for level X'8C' as defined by the third SGO command 520. The third package sub-portion in this example includes only part of the print package, i.e., page 4 through page 6. The third DGB command 522 includes a third finishing operation command 526 that contains one finishing operation triplet specifying "Cut, Perforation cut." The finishing operation triplet within the third finishing operation command 526 of this example causes the pages within the third package sub-portion to be cut with a perforation cut.

Alternative Embodiments

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when loaded and executed, controls the computer system such that it carries out the methods described herein.

The present invention can also be embedded in a computer program product, which comprises all the features enabling the implementation of the methods described herein, and which—when loaded in a computer system—is able to carry out these methods. In the present context, a "computer program" includes any expression, in any language, code or notation, of a set of instructions intended to cause a system having an information processing capability to perform a particular function either directly or after either or both of the following: a) conversion to another language, code, or notation; and b) reproduction in a different material form.

Each computer system may include one or more computers and a computer readable medium that allows the computer to read data, instructions, messages, or message packets, and other computer readable information from the computer readable medium. The computer readable medium may include non-volatile memory such as ROM, Flash memory, a hard or floppy disk, a CD-ROM, or other permanent storage. Additionally, a computer readable medium may include volatile storage such as RAM, buffers, cache memory, and network circuits. Furthermore, the computer readable medium may include computer readable information in a transitory state medium such as a network link and/or a network interface (including a wired network or a wireless network) that allow a computer to read such computer readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method of communicating processing data to ancillary printing processors, the method comprising the steps of:
    establishing a first communications link from a data source to a printer, wherein the first communications link carries printer control data in a first protocol, the first protocol defining at least one message containing finishing command data in at least one predetermined format, the at least one predetermined format corresponding to at least one format of finishing command data contained within at least one message defined by a second protocol, the second protocol being different from the first protocol;
    communicating finishing command data for at least one ancillary printing processor from the data source to the printer in a first message conforming to the first protocol, the finishing command data having a format defined by the at least one predetermined format;
    generating, at the printer, a second message conforming to the second protocol, the second message defined to contain the finishing command data in the at least one predetermined format; and
    communicating the finishing command data in the at least one predetermined format between the printer and the at least one ancillary printing processor in the second message conforming to the second protocol over a second communications link,
    wherein the first protocol is Intelligent Printer Data Stream and the second protocol is Universal Printer Pre- and Post-Processing Interface,
    wherein the Intelligent Printer Data Stream defines at least one message comprising finishing command data in the at least one predetermined format, and
    wherein the at least one predetermined format comprises a format for finishing command data that corresponds to a format of finishing command data within at least one message defined for the Universal Printer Pre- and Post-Processing Interface.

2. The method according to claim 1, wherein the first communications link is a bi-directional, point-to-point link between the data source and the printer.

3. The method according to claim 1, wherein the second communications link comprises a Universal Printer Pre- and Post-Processing Interface data link that connects the printer and the at least one ancillary printing processor.

4. A method of communicating processing data to ancillary printing processors, the method comprising the steps of:
    establishing a first communications link from a data source to a printer, wherein the first communications link carries printer control data in a first protocol, the first protocol defining at least one message containing finishing command data in at least one predetermined format, the at least one predetermined format corresponding to at least one format of finishing command data contained within at least one message defined by a second protocol, the second protocol being different from the first protocol;
    communicating finishing command data for at least one ancillary printing processor from the data source to the printer in a first message conforming to the first protocol, the finishing command data having a format defined by the at least one predetermined format;
    generating, at the printer, a second message conforming to the second protocol, the second message defined to contain the finishing command data in the at least one predetermined format; and
    communicating the finishing command data in the at least one predetermined format between the printer and the at least one ancillary printing processor in the second message conforming to the second protocol over a second communications link, wherein
    the first communications link communicates a status of the at least one ancillary printing processor that was communicated via the second communications link,
    the second communications link communicating the status in a status message defined by the second protocol, the status message defined to carry status data within at least one second predetermined format,
    the first protocol defining at least one second status message containing status data in the at least one second predetermined data format, and
    the first communications link communicating the status with the at least one second status message according to the first protocol.

5. The method according to claim 1, wherein the data contained within the printer control data and the finishing command data are derived from a job ticket, and the format of the processing data within the job ticket conforms to the second protocol.

6. The method according to claim 1, wherein the first communications link communicates printer data and the second communications link simultaneously communicates data for at least one of a pre-processing device and a post-processing device.

7. The method according to claim 6, wherein the first communications link communicates data to a printing device and wherein the second communications link communicates data to at least one of a pre-processing device and a post-processing device.

8. The method according to claim 7, wherein the first communications link further communicates status data from a printing device and the second communications link further communicates status data from at least one of a pre-processing device and a post-processing device.

9. A system for communicating processing data to ancillary printing processors, the system comprising:
    a first communications link from a data source to a printer, wherein the first communications link carries printer control data in a first protocol and finishing command data in a first message defined by the first protocol, the first protocol defining the first message to contain the finishing command data in at least one predetermined format, the at least one predetermined format corresponding to at least one format of finishing command data contained within at least one message defined by a second protocol, the second protocol being different from the first protocol;

a message processor, within the printer, adapted to generate a second message conforming to the second protocol, the second message being defined to contain the finishing command data in the at least one predetermined format;

a second communications link adapted to transmit the second message according to the second protocol from the printer to at least one ancillary printing processor; and a host/server for generating printing and finishing data for transmission over the first communications link and the second communications link, wherein the first protocol is the Intelligent Printer Data Stream and the second protocol is Universal Printer Pre- and Post-Processing Interface, wherein the Intelligent Printer Data Stream defines at least one message comprising finishing command data in the at least one predetermined format, and wherein the at least one predetermined format comprises a format for the finishing command data that corresponds to a format of finishing command data within at least one message defined for the Universal Printer Pre- and Post-Processing Interface.

10. The system according to claim 9, wherein the first communications link is a bi-directional, point-to-point link between the data source and the printer.

11. The system according to claim 9, wherein the second communications link comprise a Universal Printer Pre- and Post-Processing Interface data link that connects the printer and the at least one ancillary printing processor.

12. A system for communicating processing data to ancillary printing processors, the system comprising:

a first communications link from a data source to a printer wherein the first communications link carries printer control data in a first protocol and finishing command data in a first message defined by the first protocol, the first protocol defining the first message to contain the finishing command data in at least one redetermined format, the at least one predetermined format corresponding to at least one format of finishing command data contained within at least one message defined by a second protocol, the second protocol being different from the first protocol;

a message processor, within the printer, adapted to generate a second message conforming to the second protocol the second message being defined to contain the finishing command data in the at least one predetermined format;

a second communications link adapted to transmit the second message according to the second protocol from the printer to at least one ancillary printing processor; and a host/server for generating printing and finishing data for transmission over the first communications link and the second communications link, wherein the first communications link communicates a status of the at least one ancillary printing processor that was communicated via the second communications link, the second communications link communicating the status in a status message defined by the second protocol, the status message defined to carry status data within at least one second predetermined format, the first protocol defining at least one second status message containing status data in the at least one second predetermined data format, and the first communications link communicating the status with the at least one second status message according to the first protocol.

13. The system according to claim 9, wherein the first communications link communicates printer data and the second communications link simultaneously communicates data for at least one of a pre-processing device and a post-processing device.

14. The system according to claim 13, wherein the first communications link communicates data to a printing device and wherein the second communications link communicates data to at least one of a pre-processing device and a post-processing device.

15. The system according to claim 14, wherein the first communications link further communicates status data from a printing device and the second communications link further communicates status data from at least one of a pre-processing device and a post-processing device.

16. A computer readable medium, comprising a computer program including computer instructions for communicating processing data to ancillary printing processors, the computer instructions comprising instructions for:

establishing a first communications link from a data source to a printer, wherein the first communications link carries printer control data in a first protocol, the first protocol defining at least one message containing finishing command data in at least one predetermined format, the at least one predetermined format corresponding to at least one format of finishing command data contained within at least one message defined by a second protocol, the second protocol being different from the first protocol;

communicating finishing command data for at least one ancillary printing processor from the data source to the printer in a first message conforming to the first protocol, the finishing command data having a format defined by the at least one predetermined format;

generating, at the printer, a second message conforming to the second protocol, the second message defined to contain the finishing command data in the at least one predetermined format; and communicating the finishing command data in the at least one predetermined format between the printer and the at least one ancillary printing processor in the second message conforming to the second protocol over a second communications link, wherein the first protocol is Intelligent Printer Data Stream and the second protocol is Universal Printer Pre- and Post-Processing Interface, wherein the Intelligent Printer Data Stream defines at least one message comprising data in the at least one predetermined format, and wherein the at least one predetermined format comprises a format for the processing data that corresponds to a format of data within at least one message defined for the Universal Printer Pre- and Post-Processing Interface.

17. The computer readable medium according to claim 16, wherein the first communications link is a bi-directional, point-to-point link between the data source and the printer.

18. The computer readable medium according to claim 16, wherein the second communications link comprises a Universal Printer Pre- and Post-Processing Interface data link that connects the printer and the at least one ancillary printing processor.

19. A computer readable medium, comprising a computer program including computer instructions for communicating processing data to ancillary printing processors, the computer instructions comprising instructions for:

establishing a first communications link from a data source to a printer, wherein the first communications link carries printer control data in a first protocol, the first protocol defining at least one message containing finishing command data in at least one predetermined format, the at least one predetermined format corresponding to at least one format of finishing command data contained within at least one message defined by a second protocol, the second protocol being different from the first protocol;

communicating finishing command data for at least one ancillary printing processor from the data source to the printer in a first message conforming to the first protocol, the finishing command data having a format defined by the at least one predetermined format;

generating, at the printer, a second message conforming to the second protocol, the second message defined to contain the finishing command data in the at least one predetermined format; and communicating the finishing command data in the at least one predetermined format between the printer and the at least one ancillary printing processor in the second message conforming to the second protocol over a second communications link, wherein the first communications link communicates a status of the at least one ancillary printing processor that was communicated via the second communications link, the second communications link communicating the status in a status message defined by the second protocol, the status message defined to carry status data within at least one second predetermined format, the first protocol defining at least one second status message containing status data in the at least one second predetermined data format, and the first communications link communicating the status with the at least one second status message according to the first protocol.

20. The computer readable medium according to claim 16, wherein the first communications link communicates printer data and the second communications link simultaneously communicates data for at least one of a pre-processing device and a post-processing device.

21. The computer readable medium according to claim 20, wherein the first communications link communicates data to a printing device and wherein the second communications link communicates data to at least one of a pre-processing device and a post-processing device.

22. The computer readable medium according to claim 21, wherein the first communications link further communicates status data from a printing device and the second communications link further communicates status data from at least one of a pre-processing device and a post-processing device.

* * * * *